United States Patent [19]
Chen et al.

[11] Patent Number: 5,673,576
[45] Date of Patent: Oct. 7, 1997

[54] LOCKING DEVICE FOR CARS

[76] Inventors: Carson Ko-Sheng Chen; Chao-Yang Tang Chen, both of 4F, No. 14, Alley 8, Lane 46, Der Hsing E. Rd., Taipei, Taiwan

[21] Appl. No.: 490,298

[22] Filed: Jun. 14, 1995

[51] Int. Cl.⁶ ............................................. B60R 25/06
[52] U.S. Cl. ............................ 70/199; 70/238; 70/247
[58] Field of Search ................ 70/237–239, 198–203, 70/254, 209, 245–248

[56] References Cited

U.S. PATENT DOCUMENTS

| | | | |
|---|---|---|---|
| 3,724,246 | 4/1973 | Katsaros | 70/431 |
| 3,888,144 | 6/1975 | Parsons | 411/403 X |
| 4,747,279 | 5/1988 | Solow | 70/238 |
| 4,825,671 | 5/1989 | Wu | 70/238 |
| 4,835,999 | 6/1989 | Chant | 70/238 |
| 4,935,047 | 6/1990 | Wu | 70/238 X |
| 4,936,120 | 6/1990 | Fiks | 70/238 X |
| 4,974,433 | 12/1990 | Wang | 70/238 X |
| 5,033,281 | 7/1991 | Kofman et al. | 70/238 |
| 5,038,667 | 8/1991 | Slaters | 70/238 X |
| 5,253,497 | 10/1993 | Hsieh | 70/209 |
| 5,426,962 | 6/1995 | Kuo | 70/238 |

FOREIGN PATENT DOCUMENTS

| | | | |
|---|---|---|---|
| 925217 | 8/1947 | France | 70/238 |
| 1131583 | 10/1968 | United Kingdom | 70/202 |
| 2024307 | 1/1980 | United Kingdom | 70/238 |
| 2214885 | 9/1989 | United Kingdom | 70/247 |

*Primary Examiner*—Lloyd A. Gall
*Attorney, Agent, or Firm*—Bacon & Thomas

[57] ABSTRACT

A locking device adapted for use to lock the hand brake and gear shift of a car includes a main shaft which is a tubular structure having a lock element disposed at one side near its front end and a lock bar extending from the side and defining a check space with the main shaft, and a movable shaft which is a rod structure having a plurality of teeth at one side thereof, one end of the movable shaft being a pointed portion while the other end thereof being connected to a cap. The movable shaft is inserted into the main shaft with the lock element engaging with the teeth of the movable shaft; the space defined between the lock bar and the main shaft accommodates the gear shift and the cap is fitted on a head portion of the hand brake.

2 Claims, 4 Drawing Sheets

5,673,576

LOCKING DEVICE FOR CARS

BACKGROUND OF THE INVENTION

The present invention relates to a locking device adapted for use in cars.

Car locking devices are used to discourage theft. Conventional car locking devices are mostly designed to lock the steering wheel and the accelerator pedal or the brake of a car so that the car cannot easily be stolen.

A major disadvantage of such locking devices is that the locking function is not effective; particularly, the accelerator pedal and the brake themselves provide a one-step pedal brake space. Moreover, because such locking devices are mounted below the driver's seat, it is inconvenient to fasten or release them.

Stereo systems installed in cars are also common targets of theft. This is because car stereo systems mounted before the driver's seat have become standardized equipment and may be easily taken down. A common way of preventing theft of such stereo systems is that they are designed to be disengageable and portable so that the driver may remove and take away his/her stereo system after parking. Obviously, this is not a good solution.

SUMMARY OF THE INVENTION

A primary object of the present invention is to provide a locking device designed to lock the gear shift, hand brake and the stereo system of a car, in which when the gear shift and the hand brake are locked, even if the car is started, the gear cannot be shifted to move the car.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
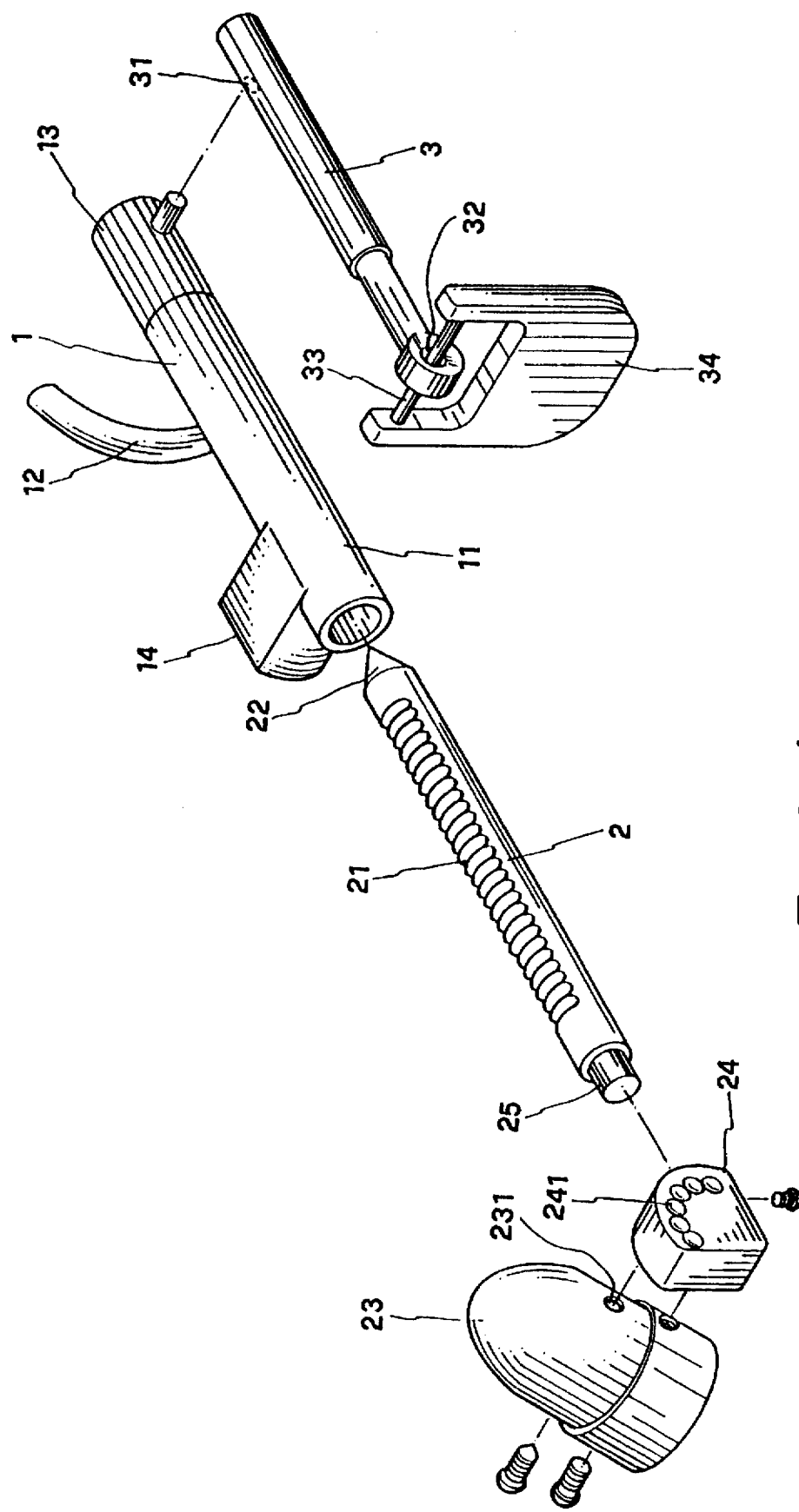
FIG. 1 is a perspective exploded view of a preferred embodiment of the locking device of the present invention.

With reference to the drawings, the locking device according to the present invention essentially comprises a main shaft 1, a movable shaft 2 and a rotary shaft 3.

The main shaft 1 chiefly consists of a hollow sleeve 11 having a lock bar 12 extending integrally from one side thereof, with an end thereof connecting to a gear box 13; a lock element 14 is also located at a suitable position on the sleeve 11.

Figure 2:
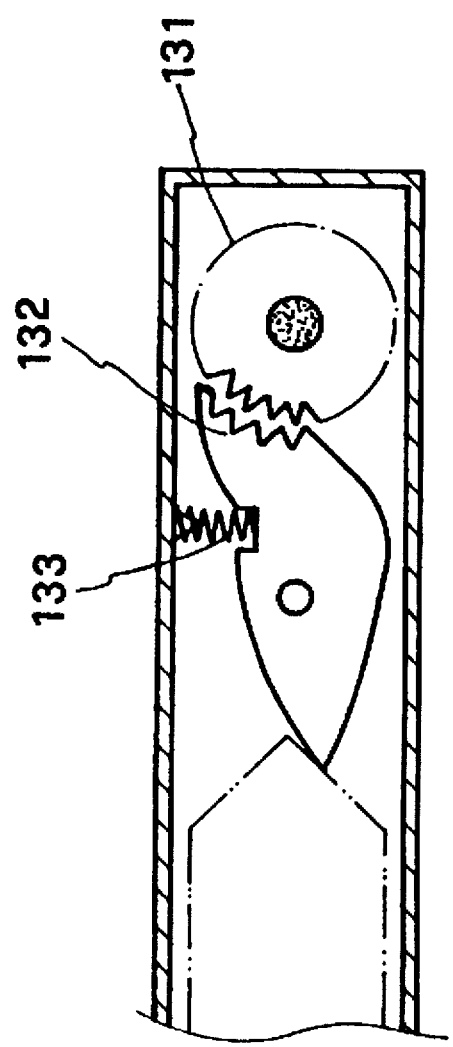
FIG. 2 is a schematic view of a preferred embodiment of the gear box of the present invention.
Figure 3:
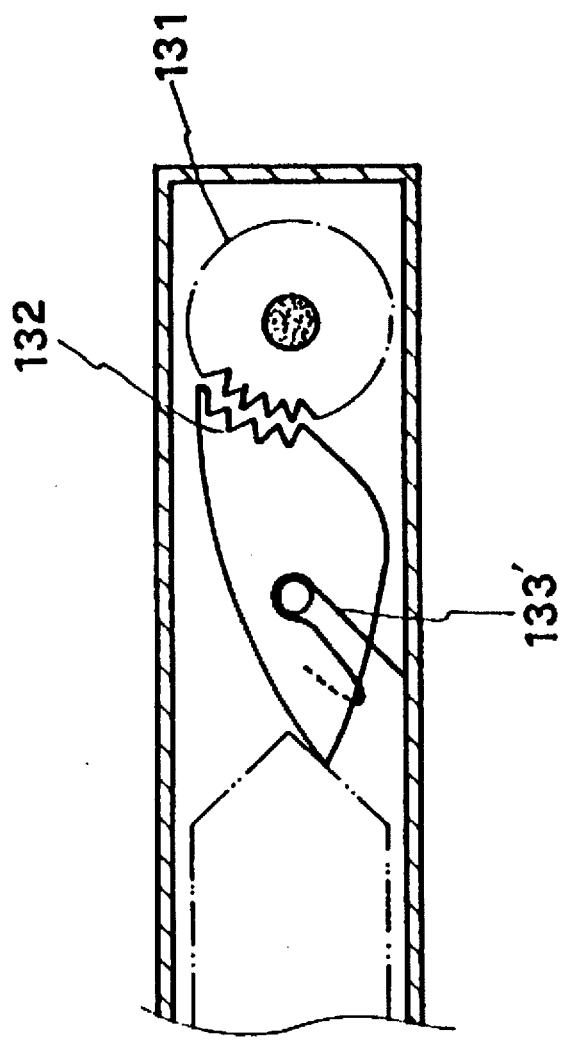
FIG. 3 is a schematic view of another preferred embodiment of the gear box of the present invention.

As shown in FIG. 2, there are provided in the gear box 13 a main gear 131 engaging with a baffle block 132 pressed against by a spring 133. Under normal circumstances, the spring 133 is in a relaxed state such that a left end of the baffle block 132 tilts upwardly, so that the main gear 131 may only rotate clockwisely along the baffle block 132. When the locking device is released, the baffle block 132 tilts in the opposite direction so that the main gear 131 may rotate counter-clockwisely, enabling the rotary shaft 3 to be disengaged from a stereo system. In FIG. 3, another preferred embodiment of the gear box 13 for achieving the same effects is shown, in which a wire spring 133 is employed to press against the baffle block 132 from below.

The lock bar 12 integrally extends from the sleeve 11 and then bends. The distance between the lock bar 12 and the sleeve 11 defines a substantially V-shaped space for receiving the gear shift, such that the gear shift cannot be moved rearwardly once the locking device of the present invention is secured in place. As for the lock element 14, when a key is inserted and turned therein, a baffle piece (not shown) of the lock element 14 will project outwardly, engaging teeth 21 of the movable shaft 2 disposed inside the sleeve 11.

The movable shaft 2 is a solid rod structure, having a plurality of parallel teeth 21 for engaging with the lock element 14. The movable shaft 2 has a pointed portion 22 at an extreme end thereof for pressing against the above-mentioned baffle piece 132 when the movable shaft 2 penetrates into the main shaft 1, so that the baffle piece 132 disengages from the main gear 131 to release rotary shaft 3. The other end of the movable shaft 2 is a cap 23 integrally and obliquely extending therefrom. The cap 23 is substantially configured to resemble the shape of a helmet. An interior space of the cap 23 corresponds to a head portion of the hand brake so that the cap 23, may fit onto the head portion of the hand brake to restrain it from downward movement.

Figure 4:
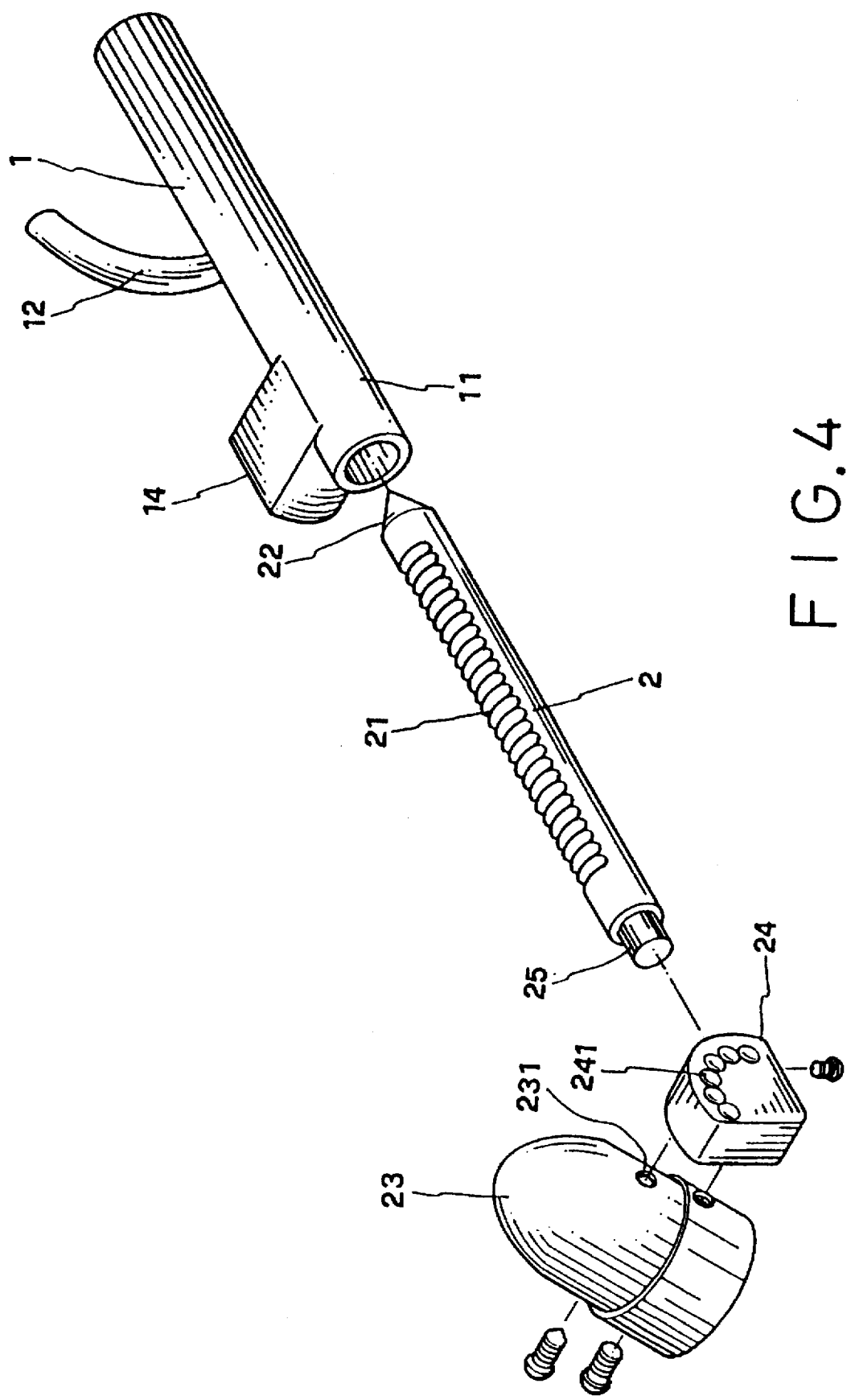
FIG. 4 is a perspective exploded view of another preferred embodiment of the locking device of the present invention.

The cap 23 and the movable shaft 2 may be integrally formed. Alternatively, as shown in FIGS. 1 and 4, a seat 24 may be provided to be locked together with the cap 23 by means of screws. To enable angle adjustment of the seat 24, the seat 24 is provided with a plurality of holes 241 for matching a plurality of cap holes 231 provided in the cap 23. After angle adjustment, screws are passed through the cap holes 231 and the holes 241 to securely position the cap 23 and the seat 24.

With reference to FIGS. 1 and 4, the movable shaft 2 has a post 25 at a front end thereof opposite to the pointed portion 22. The post 25 has a smaller diameter than that of the movable shaft 2. The post 25 is inserted into a corresponding opening (not shown) provided in the seat 24, and a screw is used to securely position the post 25 within the opening of the seat 24. In actual production, the seat 24 may be integrally formed with the movable shaft 2.

The rotary shaft 3 is also a rod structure, having one side thereof provided with a hole 31 for receiving an output axle of the main gear 131. An extreme end of the movable shaft 3 is provided with a ring 32 with a rod 33 passing therethrough. The rod 33 is further connected to a check piece 34 for insertion into an insert hole of a cassette tape recorder of the car when the locking device of the present invention is locked. To ensure that the check piece 34 will not damage the interior of the insert hole of the cassette tape recorder, elastic material may be used to wrap around the check piece 34. Additionally, in order to match the different positions of cassette tape recorders provided with various car models, the rotary shaft 3 may be formed in sections.

Referring to the drawings, in actual practice, the cap 23 is firstly fitted onto the head portion of the hand brake, and the sleeve 11 and the movable 2 are adjusted. The cap 23 is then locked to the seat 24 by screws passing through the cap holes 231 and the holes 241; the locking device can henceforth be used for a particular car model. Then the substantially V-shaped space defined between the lock bar 12 and the sleeve 11 is arranged to abut against the gear shift, and the rotary shaft 3 is turned in a clockwise direction, and the check piece 34 is inserted into the insert hole of the cassette tape recorder. The key is then removed, accomplishing the locking operation.

To release the locking device, the key has to be inserted into the lock element 14 and turned; the main shaft 1 and the rotary shaft 3 are pulled backwardly simultaneously, and the cap 23 is disengaged from the hand brake.

Therefore, by means of the above-described locking device construction, in addition to accomplishing the locking of the gear shift, the hand brake and the car stereo system, since the cap 23 and the seat 24 are adjustable, it is only necessary to adjust and position them at the initial use; the locking device with the cap 23 and the seat 24 properly adjusted and positioned may henceforth be used on a particular car. Moreover, since the check piece 34 of the rotary shaft 3 may be inserted into the cassette tape recorder, the car stereo system may be more securely protected against possible theft.

In addition, because there are various kinds and models of car stereo systems, in order to accommodate the situation in which it is not desirable to lock the stereo system, another preferred embodiment of the locking device according to the present invention is provided, which is shown in FIG. 4. In this embodiment, the rotary shaft 3 is eliminated and the gear box 13 may also be removed. Besides, the extreme end of the sleeve 11 is configured to be closed. Such an embodiment is used to lock only the hand brake and the gear shift.

Although the present invention has been illustrated and described with reference to the preferred embodiments thereof, it should be understood that it is in no way limited to the details of such embodiments but is capable of numerous modifications within the scope of the appended claims.

I claim:

1. A locking device adapted for use to lock a gear shift and a hand brake of a car, wherein the hand brake has a head portion, said locking device comprising:
   a main tubular shaft having a lock element disposed near a front end thereof at one side thereof and a lock bar extending from a side thereof, said lock bar and said main shaft forming a check space therebetween configured to receive the gear shift therein;
   a movable shaft rod having a multiplicity of retaining teeth on one side thereof, a first end having a pointed portion, and a second end;
   a cap having a closed end and an open end forming an interior space configured to receive the head portion of the hand brake therein, the cap rigidly affixed to the second end of the movable shaft rod;
   a seat on the second end of the movable shaft rod; and,
   connecting means rigidly connecting the cap to the seat in one of a plurality of different positions, wherein when said movable shaft rod is inserted into said main shaft, by means of said lock element being engaged with said retaining teeth of said movable shaft, the check space between said lock bar and said main shaft receives the gear shift while said cap of said movable shaft rod is fitted onto the head portion of the hand brake.

2. The locking device as claimed in claim 1, wherein said main shaft further comprises a gear box at a rear end thereof, said gear box having a main gear and a baffle block pressed against the main gear by a spring, said main gear having a pivot axle connected to a rotary shaft, said rotary shaft pivotally connected to said main shaft and having a check piece for insertion into an insert hole of a cassette tape recorder to protect the cassette tape recorder from possible theft.

* * * * *